May 10, 1955 H. O. KIRKPATRICK Re. 23,998
REFRIGERATION APPARATUS FOR MOTOR VEHICLES
Original Filed Oct. 4, 1949
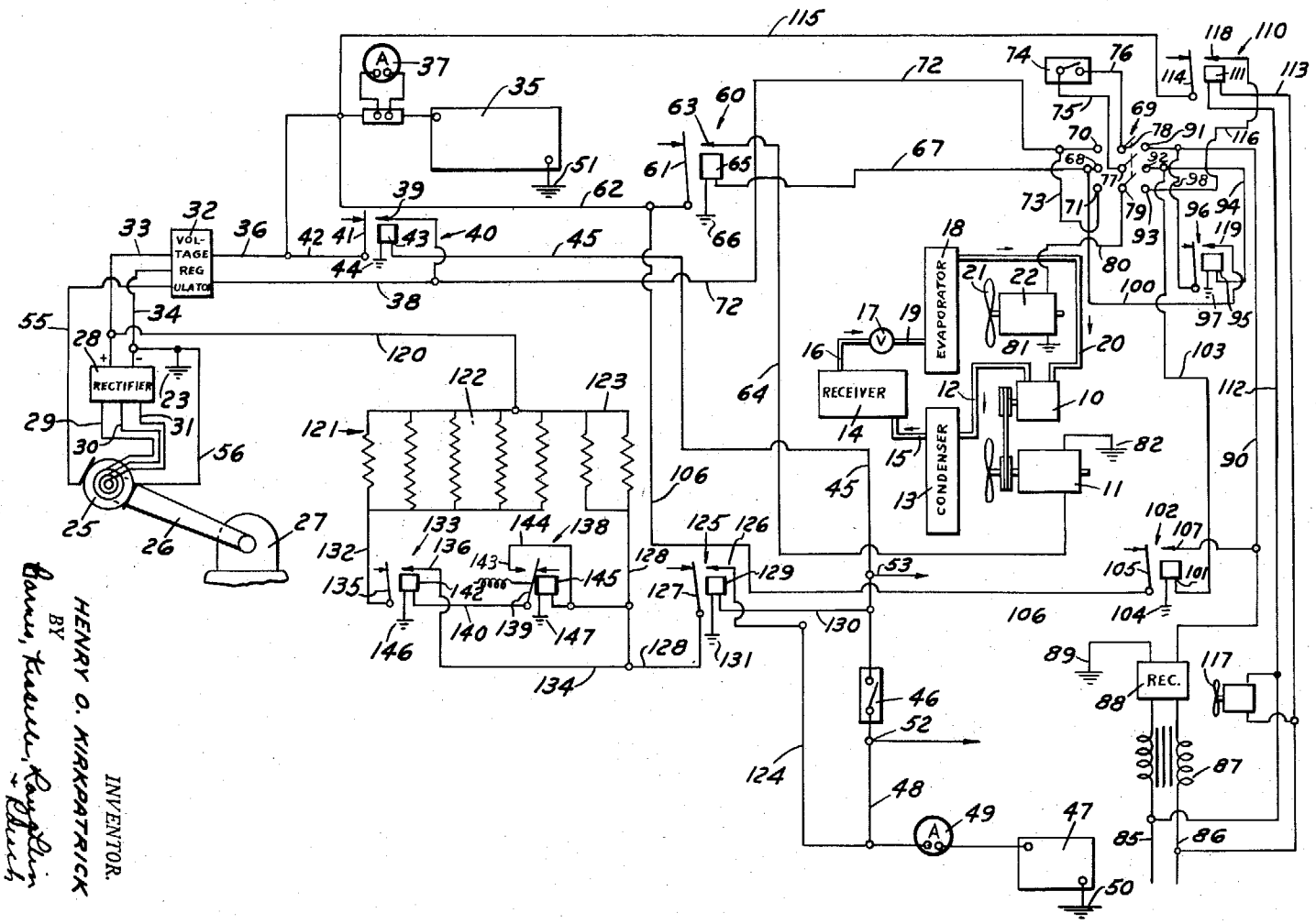
INVENTOR.
HENRY O. KIRKPATRICK
BY
Barnes, Kisselle, Raymond & Rauch
ATTORNEYS United States Patent Office Re. 23,998

Reissued May 10, 1955

23,998

REFRIGERATION APPARATUS FOR MOTOR VEHICLES

Henry O. Kirkpatrick, Chicago, Ill., assignor, by mesne assignments, to Union Asbestos and Rubber Company, Chicago, Ill., a corporation of Illinois Original No. 2,608,066, dated August 26, 1952, Serial No. 119,426, October 4, 1949. Application for reissue March 9, 1954, Serial No. 415,188

6 Claims. (Cl. 62—4)

Matter enclosed in heavy brackets [ ] appears in the original patent but forms no part of this reissue specification; matter printed in italics indicates the additions made by reissue.

This invention relates to a refrigerating apparatus for a motor vehicle.

It is an object of this invention to produce a refrigerating apparatus for a motor vehicle which is adapted to receive its power from a generator which is driven by the vehicle engine or a battery connected therewith while the vehicle is running and from a standard 110 volt alternating current outlet when the vehicle is parked, such as overnight.

The invention generally contemplates a refrigerating apparatus having a compressor motor and an air circulating motor of the direct current low voltage type which are arranged to be connected for operation to a conventional storage battery on the vehicle or to a standard 110 volt alternating current outlet through a step down transformer and a rectifier.

More specifically, the invention contemplates an electrical arrangement on a motor vehicle which includes a generator operated by the vehicle engine, a refrigerating apparatus, and two storage batteries arranged to be maintained in a charged condition by the generator, one storage battery providing the necessary current for the lights, ignition system, etc., of the vehicle, while the other battery provides current for the refrigerating apparatus when the current being developed by the generator is insufficient to meet the needs of the refrigerating apparatus, such as when the compressor motor is started.

The drawing shows a diagrammatic view of a refrigerating apparatus for a motor vehicle embodying my invention.

As is shown in the drawings, the refrigerating apparatus comprises a conventional arrangement which includes a compressor 10 for the refrigerant which is belt driven from a motor 11. The compressor outlet is connected by a conduit 12 to a condenser 13 which is in turn connected to a receiver 14 by a conduit 15. From receiver 14 the refrigerant is conducted by a conduit 16 through an expansion valve 17 and thence to an evaporator 18 through conduit 19. The outlet of evaporator 18 is connected by a conduit 20 with the inlet of compressor 10. An air circulating fan 21 driven by a motor 22 directs air from the refrigerated compartment (not shown) against evaporator 18 so as to cool the air. Motors 11 and 22 are designed to be operated on direct current at low voltage, that is, at about twelve volts.

The current generating source on the vehicle comprises a conventional three phase alternator 25 which is arranged to be driven by a belt 26 from the crank shaft of a vehicle engine 27. Alternator 25 is of the revolving field type, the stator in which the current is generated being connected to a rectifier 28 by three conductors 29, 30 and 31. Rectifier 28 is preferably of the dry plate type and designed for three phase, full wave rectification. The output terminals of the rectifier are the positive and negative sides of the direct current line and are connected to a conventional voltage regulator 32 by conductors 33 and 34, respectively. The negative side of the line is grounded as at 23.

The battery terminal of voltage regulator 32 is connected to the positive side of a twelve volt storage battery 35 by a conductor 36 through an ammeter 37 which is shunted across the line. The ignition terminal of voltage regulator 32 is connected by a conductor 38 with the closing contact 39 of a relay 40. The movable contact 41 of relay 40 is connected with conductor 36 by a conductor 42. The armature coil 43 of relay 40 is grounded at one end as at 44 and is connected at its other end by a conductor 45 to one side of an ignition switch 46. The other side of switch 46 is connected to the positive side of a conventional six volt storage battery 47 by a conductor 48 through an ammeter 49. The negative side of battery 47 is grounded as at 50 and the negative side of battery 35 is grounded as at 51. The lighting circuit for the vehicle is connected with battery conductor 48 as at 52. The ignition circuit for the vehicle engine is connected to battery 47 beyond switch 46 as at 53 with conductor 45.

The field of alternator 25 is arranged to be excited by battery 35 when ignition switch 46 is turned on and is accordingly connected at one end to a load relay circuit (not shown) in voltage regulator 32 by a conductor 55. The other end of the field coil of alternator 25 is connected to ground 23 by a conductor 56.

Compressor motor 11 is connected to battery 35 through a relay 60. The movable contact 61 of relay 60 is connected by a conductor 62 with conductor 36 and the closing contact 63 of relay 60 is connected with motor 11 by a conductor 64. The armature coil 65 of relay 60 is grounded at one end as at 66 and connected at the other end by conductor 67 with one terminal 68 of a three pole, double throw switch 69. The other two terminals on the same side of switch 69 are indicated as 70 and 71. Terminal 70 is connected with conductor 38 by a conductor 72 and a terminal 71 is connected with conductor 72 by a conductor 73. A thermostatic switch 74 is connected by conductors 75 and 76 in series with center terminals 77 and 78 of switch 69. The other center terminal 79 of switch 69 is connected with fan motor 22 by a conductor 80. Motors 22 and 11 are grounded as at 81 and 82 respectively.

For operating the refrigerating apparatus from a standard 110 volt A. C. outlet there is provided a pair of conductors 85 and 86 which may be provided at one end with a convention plug (not shown). At their other ends conductors 85 and 86 are connected to the high side of a step down transformer 87, the low side of which is connected to the input side of a rectifier 88. The negative line of rectifier 88 is grounded as at 89 while the positive line of rectifier 88 is connected by a conductor 90 with a terminal 91 of switch 69 on the opposite side of terminals 68, 70, and 71. The other two terminals of switch 69 on the same side as terminal 91 are designated at 92 and 93. Terminal 92 is connected by a conductor 94 with one end of the armature coil 95 of a relay 96. The other end of coil 95 is grounded as at 97. A conductor 98 connects the movable contact 99 of relay 95 with conductor 90, the closing contact 119 of relay 95 being connected with conductor 67 by conductor 100. Terminal 92 of switch 69 is also connected to one end of the armature coil 101 of a relay 102 by conductor 103. The other end of coil 101 is grounded as at 104. Relay 102 has its movable contact 105 connected with battery conductor 62 by a conductor 106. The closing contact 107 of relay 102 is connected with conductor 90. A relay 110 has its armature coil 111 connected across conductors 85 and 86 by means of a pair of conductors 112 and 113. The movable contact 114 of relay 110 is connected with conductor 62 and battery 35 by a conductor 115. Relay 110 has its closing contact 118 connected with terminal 93 of switch 69 by a conductor 116. A fan 117 is connected across conductors 112 and 113 and is arranged to cool rectifier 88 when conductors 85 and 86 are connected into a source of 110 volt alternating current.

Alternator 25 is arranged to provide current for charging not only battery 35 but also battery 47. For this purpose there is provided a conductor 120 which is connected at one end to the positive conductor 33 leading from rectifier 28 and at its other end to a resistance bank 121. Resistance bank 121 comprises two sets of resistors 122 and 123 connected in parallel with conductor 120, the total resistance of resistors 122 being much less than the total resistance of resistors 123. Both sets of resistors are connected in parallel to battery 47 by a conductor 124 and a relay 125. Conductor 124 is connected between the closing contact 126 of relay 125 and battery conductor 48. The movable contact 127 of relay 125 is connected by a conductor 128 with resistors 123. Relay 125 has its armature coil 129 connected at one end by a conductor 130 with conductor 45 and is grounded at the other end as at 131. Resistors 122 are also connected with conductor 128 by a conductor 132, a relay 133 and a conductor 134. Conductor 132 connects with the movable contact 135 of relay 133 and conductor 134 connects with the closing contact 136 of relay 133. Relay 133 is arranged to be controlled by a voltage sensitive relay 138 having a movable contact 139 connected by a conductor 140 with one end of the armature coil 142 of relay 133 and a closing contact 143 connected by a conductor 144 with conductor 128. The sensitive armature coil 145 of relay 138 is connected at one end with conductor 144. Coils 142 and 145 are grounded as at 146 and 147, respectively. The movable contact 139 of relay 138 is biased to the closed position, the coil 145 of the relay being sensitive to the E. M. F. across battery 47 such that when the voltage across the battery drops below a predetermined value, the current through coil 145 is insufficient to hold the relay closed, and the movable contact 139 is pulled to close with contact 143.

When it is desired to operate the refrigerating apparatus from battery 35 and alternator 25, the handle of switch 69 is closed with the contacts on the battery side of the switch and ignition switch 46 closed to enable starting of the engine. The closing of switch 46 closes a circuit from battery 47, through conductors 48 and 45 and the armature coil 43 of relay 40. When relay 40 pulls in, current flows from either battery 35 or voltage regulator 32 through conductors 36 and 42, contacts 41 and 39, and conductors 72 and 73 to terminal 71 on a switch 69. From terminal 71 the current flows through the switch to terminal 79 and then through conductor 80 to the fan motor 22. Fan motor 22 will therefore operate continually when ignition switch 46 is turned to the "on" position and switch 69 closed with the battery side of the circuit. Thermostatic switch 74 is located in the refrigerating compartment of the vehicle (not shown) and if the temperature of the compartment is above the setting of switch 74, current through conductor 72, which is connected with terminal 70 of switch 69, also flows through conductor 76, switch 74, conductor 75, terminals 77 and 68, and conductor 67 to the armature coil 65 of relay 60. Relay 60 thereby pulls in and closes a circuit between battery 35 or voltage regulator 32 and compressor motor 11 through conductor 62, contacts 61 and 63 of relay 60, and conductor 64. Compressor motor 11 is thereby set in operation. When the temperature of the refrigtrating compartment falls to the setting of switch 74, switch 74 opens, thereby opening the circuit through coil 65 of relay 60 and the relay falls out to open the circuit to the compressor motor. It will be appreciated, of course, that battery 35 supplies the extra current required when the current through voltage regulator 32 is insufficient to meet the demands of compressor motor 11, such as when motor 11 draws an excessive starting current. When the voltage across battery 35 falls below twelve volts, it is charged through conductor 36 by the current flowing from voltage regulator 32.

In the arrangement shown, alternator 25 is preferably designed to generate about 100 amperes at fourteen volts. An alternator of this capacity is sufficient in the arrangement shown to charge both battery 35 and battery 47. When the voltage across battery 47 is at or near its seven volt rating, movable contact 139 of relay 138 is held by coil 145 in the open position. Coil 145 is designed to hold contact 139 in the open position as long as the voltage across battery 47 exceeds a predetermined value, such as, for instance, six and one-half volts. Therefore, during normal operation, when the E. M. F. across battery 47 is more than seven volts, the circuit through resistors 122 is open and the only current flowing from rectifier 28 to battery 47 and the ignition and lighting circuits of the vehicle is that which flows through resistors 123. When ignition switch 46 is closed a circuit from battery 47 to relay 125 is closed through conductors 48 and 130 and coil 124. This causes relay 125 to pull in so that a circuit is closed through conductor 120, resistors 123, conductor 128, contacts 127 and 126, and conductors 124, 48 and 45 to the ignition and lighting circuits of the vehicle. Resistors 123 are designed such that current flowing through the last-mentioned circuit is sufficient at normal engine speeds to take care of the normal demands of the ignition and lighting circuits of the vehicle. During normal speeds of the engine, this current amounts to about four amperes at seven volts.

When the engine of the vehicle is started or when an excessive load is placed on the lighting circuit, it will be appreciated that the voltage across battery 47 will be dropped below a normal value. When this occurs, contact 139 of relay 138 will fall out and close with contact 143. The current in the conductor 138 will then flow through conductor 144, contacts 143 and 139, conductor 140, and through coil 142 of relay 133. The closing of relay 138 thereby pulls in relay 133 which closes a circuit through conductor 120, resistors 122, conductor 132, contacts 135 and 136, conductors 134 and 128, through relay 125 and conductor 124 to battery 47. Resistors 122 are designed such that the current flowing therethrough is greatly in excess of the current flowing through resistors 123. That is, while the current through resistors 123 is about 4 amperes, the current flowing through resistors 122 is in the neighborhood of 30 amperes. This large current serves to charge battery 47 back to its normal rating of seven volts. When the voltage across battery 47 approaches seven volts, movable contact 139 of relay 138 is pulled to the open position thereby opening the circuit through resistors 122 and permitting the trickle charge to flow through resistors 123.

When the vehicle engine is stopped and it is desired to continue the operation of the refrigerating apparatus, such as when the vehicle is parked overnight, the handle of switch 69 is shifted to close with the contacts on the external power source side of the switch. With switch 69 in this position, conductors 85 and 86 may be connected with a 110 volt alternating current outlet to operate the refrigerating apparatus. When conductors 85 and 86 are connected with a source of alternating current, it will be noted that a circuit is closed through coil 111 of relay 110 and fan motor 117 by conductors 112 and 113. Relay 110 is thereby pulled in to close a circuit from battery 35 through conductor 115, contacts 114 and 118, conductor 116, terminals 93 and 79, and conductor 80 to fan motor 22. Fan motor 22 is therefore in continual operation when conductors 85 and 86 are plugged into a source of alternating current. When switch 74 is closed, that is, when the temperature of the refrigerating compartment is above the setting of the switch, current also flows through transformer 87, rectifier 88, conductors 90, terminals 91 and 78, conductor 76, through switch 74, conductor 75, terminals 77 and 92, and from terminal 92 through conductor 103 to coil 101 of relay 102. The current flowing through switch 74 also flows from terminal 92 through conductor 94 and coil 95 of relay 96. The movable contacts 99 and 105 of relays 96 and 102 respectively are thereby pulled to the closed position. The closing of relay 96 closes a circuit from the rectifier through conductors 90 and 98, contacts 99 and 119, conductors 100 and 67, and coil 65 of relay 60. With relays 60 and 102 both pulled in, a circuit is closed from rectifier 88 through conductor 90, contacts 107 and 105, conductor 106, contacts 61 and 63, and conductor 64 to compressor motor 11. When the temperature within the refrigerating compartment falls to the setting of switch 74, relays 96, 102, and 60 fall out and thereby open the circuit to the compressor motor and battery 35.

I claim:

[1. A refrigerating apparatus for a motor vehicle of the type having a refrigerating compartment comprising an alternator arranged to be driven by the engine of the vehicle, a rectifier connected with the output side of said alternator, a refrigerating apparatus on said vehicle, a direct current motor for operating said refrigerating apparatus, said motor being connected with said rectifier for operation by said alternator, a first battery connected with said rectifier and said refrigerating apparatus motor, said vehicle including an ignition and a lighting circuit connected with said rectifier, and a second battery connected with said rectifier and said ignition and lighting circuits, said batteries each being arranged to be charged by the current supplied by said alternator.]

[2. The combination set forth in claim 1 including electrically actuated means connected with said second battery and operative to connect and disconnect said first battery with said refrigerating apparatus motor and switch means for controlling the supply of current to said electrically actuated means, whereby said first battery is prevented from supplying current to said motor unless said switch means is actuated to permit current to flow from said second battery to said electrically actuated means.]

[3. The combination set forth in claim 1 including a thermostatic switch between said motor and said first battery and alternator for controlling the flow of current from said first battery and alternator to said motor, said thermostatic switch being responsive to the temperature of said refrigerating compartment for opening and closing the circuit including said first battery, said alternator and said motor.]

4. A refrigerating apparatus for a vehicle of the type having a refrigerating compartment and a lighting and ignition circuit designed to be operated on a low voltage comprising a refrigerating apparatus in said refrigerating compartment, a direct current motor for operating said refrigerating apparatus, said motor being designed for operation at substantially higher voltage than the voltage requirements of said ignition and lighting circuit, an alternator adapted to generate current at the voltage requirements of said motor, a rectifier connected with the output side of said alternator, means connecting said motor with the direct current side of said rectifier, a battery having a normal voltage corresponding to the voltage requirements of said motor, said battery being arranged to supply current to said motor and to be charged by said alternator, a second battery having a normal voltage corresponding to the voltage requirements of said lighting and ignition circuit and connected with said lighting and ignition circuit for supplying current thereto, and means connecting said second battery with said rectifier for charging said second battery from said alternator, said last mentioned means being arranged to reduce the voltage supplied to said second battery from said alternator and to control the current supplied to said second battery in accordance with the load on said lighting and ignition circuit.

5. The combination set forth in claim 4 wherein said last mentioned means comprises means forming a normally closed circuit of high resistance between said second battery and said alternator, means forming a normally opened circuit of low resistance between said alternator and said second battery, the resistance of said circuit of high resistance being such that the current flowing through said circuit from said alternator is sufficient to meet only the normal demands of said lighting and ignition circuit, the resistance of said low resistance circuit being such that the current flowing therethrough from said alternator is relatively large as compared with the current flowing through said high resistance circuit, and means responsive to the voltage across said second battery for closing said circuit of low resistance when the voltage across said second battery falls below a predetermined value.

6. The combination set forth in claim 5 wherein said means for closing said low resistance circuit comprises a voltage sensitive relay in said low resistance circuit having an armature coil connected with said second battery.

7. The combination set forth in claim 5 wherein said high and low resistance circuits are connected in parallel between said battery and said alternator, said means for closing said circuit of low resistance comprising a voltage sensitive relay in said low resistance circuit having an armature coil connected to said second battery, said relay having a pair of normally open contacts providing a break in said low resistance circuit, said contacts being arranged to close when the voltage across said second battery falls below said predetermined value.

*8. A refrigerating apparatus for a motor vehicle of the type having a refrigerating compartment comprising an alternator arranged to be driven by the engine of the vehicle, a rectifier connected with the output side of said alternator, a refrigerating apparatus on said vehicle, a direct current motor for operating said refrigerating apparatus, said motor being connected with said rectifier for operation by said alternator, a first battery connected with said rectifier and said refrigerating apparatus motor, said vehicle including an ignition and a lighting circuit connected with said rectifier, a second battery connected with said rectifier and said ignition and lighting circuits, said batteries each being arranged to be charged by the current supplied by said alternator, electrically actuated means connected with said second battery and operative to connect and disconnect said first battery with said refrigerating apparatus motor and switch means for controlling the supply of current to said electrically actuated means, whereby said first battery is prevented from supplying current to said motor unless said switch means is actuated to permit current to flow from said second battery to said electrically actuated means.*

*9. A refrigerating apparatus for a motor vehicle of the type having a refrigerating compartment comprising an alternator arranged to be driven by the engine of the vehicle, a rectifier connected with the output side of said alternator, a refrigerating apparatus on said vehicle, a direct current motor for operating said refrigerating apparatus, said motor being connected with said rectifier for operation by said alternator, a first battery connected with said rectifier and said refrigerating apparatus motor, said vehicle including an ignition and a lighting circuit connected with said rectifier, a second battery connected with said rectifier and said ignition and lighting circuits, said batteries each being arranged to be charged by the current supplied by said alternator, a thermostatic switch between said motor and said first battery and alternator for controlling the flow of current from said first battery and alternator to said motor, said thermostatic switch being responsive to the temperature of said refrigerating*

*compartment for opening and closing the circuit including said first battery, said alternator and said motor.*

References Cited in the file of this patent or the original patent

UNITED STATES PATENTS

| | | |
|---|---|---|
| 1,892,617 | Honey | Dec. 27, 1932 |
| 1,943,966 | Hulse | Jan. 16, 1934 |
| 1,966,164 | Clark | July 10, 1934 |
| 2,037,713 | Frese | Apr. 21, 1936 |
| 2,104,383 | Candor | Jan. 4, 1938 |
| 2,115,472 | Sargent | Apr. 26, 1938 |
| 2,135,125 | Frese | Nov. 1, 1938 |
| 2,193,835 | Murphy | Mar. 19, 1940 |
| 2,284,546 | Von Ohlsen | May 26, 1942 |
| 2,339,903 | Alexander | Jan. 25, 1944 |
| 2,506,809 | Nims | May 9, 1950 |
| 2,541,904 | Alexander | Feb. 13, 1951 |